(12) United States Patent
Zhan

(10) Patent No.: US 12,171,635 B1
(45) Date of Patent: Dec. 24, 2024

(54) DENTAL APPLIANCE WITH FUNCTIONAL COATING LAYER

(71) Applicant: ArtechX Technologies, LLC, Houston, TX (US)

(72) Inventor: Xiang Zhan, Shanghai (CN)

(73) Assignee: ArtechX Technologies, LLC, Houston, TX (US)

( * ) Notice: Subject to any disclaimer, the term of this patent is extended or adjusted under 35 U.S.C. 154(b) by 0 days.

(21) Appl. No.: 18/401,136

(22) Filed: Dec. 29, 2023

Related U.S. Application Data

(63) Continuation-in-part of application No. 18/454,787, filed on Aug. 24, 2023.

(51) Int. Cl.
*A61C 7/08* (2006.01)

(52) U.S. Cl.
CPC ..................................... *A61C 7/08* (2013.01)

(58) Field of Classification Search
CPC .... A61K 6/20; A61K 6/62; A61C 7/08; A61C 13/09; B33Y 70/00; B33Y 70/10; B33Y 10/00; B29C 64/124
See application file for complete search history.

(56) References Cited

U.S. PATENT DOCUMENTS

| | | | | |
|---|---|---|---|---|
| 2014/0242535 | A1* | 8/2014 | Lowe | A61C 19/063 433/18 |
| 2018/0290377 | A1* | 10/2018 | Talken | C08F 220/34 |
| 2020/0282639 | A1* | 9/2020 | Angelini | G03F 7/027 |
| 2021/0229364 | A1* | 7/2021 | McLeod | B33Y 50/02 |
| 2021/0361389 | A1* | 11/2021 | Mac Murray | A61C 7/08 |

FOREIGN PATENT DOCUMENTS

| WO | WO-2020225657 A1 * | 11/2020 | | A61C 7/08 |
|---|---|---|---|---|
| WO | WO-2021183925 A1 * | 9/2021 | | A61C 7/002 |

* cited by examiner

*Primary Examiner* — Jacqueline T Johanas
*Assistant Examiner* — Matthew P Saunders
(74) *Attorney, Agent, or Firm* — ANOVA LAW GROUP, PLLC

(57) ABSTRACT

A dental appliance includes a base and a coating layer. The base includes a 3D shell-shaped structure configured according to a treatment plan, polymeric materials, and unbound small molecules. The ratio of the weight of the unbound small molecules to the weight of the base is greater than a first predetermined value for improving ductility and toughness of the base. The coating layer is formed over an inner surface and an outer surface of the base. The coating layer surrounds the base and blocks movements of the unbound small molecules.

10 Claims, 8 Drawing Sheets

DENTAL APPLIANCE WITH FUNCTIONAL COATING LAYER

CROSS-REFERENCE TO RELATED APPLICATION

This application is a Continuation-In-Part of application Ser. No. 18/454,787, filed Aug. 24, 2023, the disclosure of which is hereby incorporated in its entirety by reference thereto.

TECHNICAL FIELD

The present disclosure generally relates to the field of dental appliances and, more particularly, relates to dental appliances with unbound small molecules and a functional coating layer and fabrication methods thereof.

BACKGROUND

Shell-shaped dental appliances such as clear aligners are made of polymeric materials, e.g., thermoplastic polymers or polymers cured by ultraviolet light. Directly three-dimensional (3D)-printing dental appliances provides numerous advantages such as exceptional precision in shape and size customization, streamlining of the manufacturing process, reduction in waste production, and ability to incorporate complex features and structures. As polymeric materials could contain unreacted monomers, 3D-printed aligners can have a certain amount of monomers. Monomers are molecules with small molecular weight. When a 3D-printed aligner is placed in an oral cavity, i.e., a water environment, the residual monomers in the aligner can leach out over time. Since some monomers are not biocompatible and can elicit adverse reactions when in contact with oral tissues, it can cause safety concerns.

Polymers cured by ultraviolet light are often characterized by high rigidity, limited ductility, and limited toughness, due to high glass transition temperature and high crosslink density. Because aligners require a material with high ductility and high toughness, it is desirable to improve the ductility and toughness of 3D printing polymers.

Further, when a patient wears a 3D-printed aligner, prolonged exposure to water can also cause absorption of water and swelling, warping, or degradation of certain polymeric materials. It can affect the structural integrity and properties of the aligner. Moreover, water can act as a solvent for certain monomers. After water comes into contact with a 3D-printed aligner, it can accelerate the release of monomers from the polymeric materials.

The disclosed dental appliances and methods are directed to solve one or more problems set forth above and other problems.

BRIEF SUMMARY OF THE DISCLOSURE

In one aspect of the present disclosure, a dental appliance includes a base and a coating layer. The base includes a 3D shell-shaped structure configured according to a treatment plan, polymeric materials, and unbound small molecules. The ratio of the weight of the unbound small molecules to the weight of the base is greater than a first predetermined value for improving ductility and toughness of the base. The coating layer is formed at least in a partial region of an inner surface and an outer surface of the base. The coating layer surrounds the base at least partially and blocks the movement of the unbound small molecules.

In another aspect of the present disclosure, a method for fabricating a dental appliance includes forming a base by a 3D printing technique, and forming a first layer at least in a partial region of an inner surface and an outer surface of the base. The base includes a 3D shell-shaped structure corresponding to a treatment plan, polymeric materials, and unbound small molecules. The ratio of the weight of the unbound small molecules to the weight of the base is greater than a first predetermined value for improving ductility and toughness of the base. The first layer surrounds the base at least partially and blocks the movement of the unbound small molecules.

In another aspect of the present disclosure, a dental appliance includes a base. The base contains a 3D shell-shaped structure configured according to a treatment plan, polymeric materials, and unbound small molecules. The ratio of the weight of the unbound small molecules to the weight of the base is greater than a first predetermined value and smaller than a second predetermined value for improving ductility and toughness of the base. The unbound small molecules include a nonreactive compound and/or unreacted monomers.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1A:
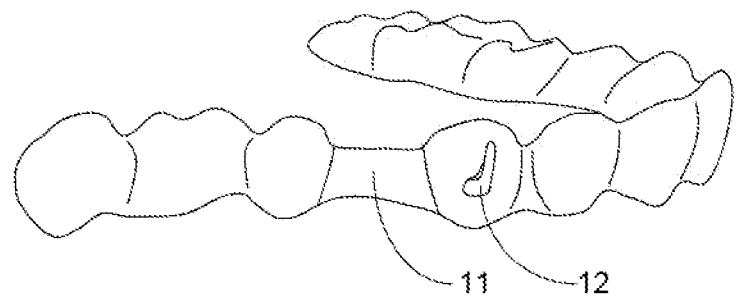
FIGS. 1A and 1B illustrate a view from a side and a bottom view of an exemplary aligner base in accordance with various embodiments of the present disclosure.

Reference will now be made in detail to exemplary embodiments of the disclosure, which are illustrated in the accompanying drawings.

Shell-shaped dental appliances are typically used to perform specific functions. Commonly used shell-shaped dental appliances include clear aligners for teeth straightening. When a patient has mal-positioned teeth or misaligned bite patterns, orthodontic procedures are needed to move the teeth into desired locations. Compared to traditional metal braces, clear aligners are less visible and more comfortable, while applying constant gentle forces to reposition misaligned teeth and change bite configurations. Clear aligners are commonly shell-shaped dental appliances made of transparent polymeric materials with biocompatibility.

Clear aligners may be fabricated by thermoforming using materials containing uncrosslinked polymer chains. First, an intraoral scan is performed to obtain a 3D structure of a patient's dental arch. Based on the 3D structure, a dental practitioner creates an orthodontic treatment plan to adjust positions and orientations of the patient's teeth. The orthodontic treatment plan may also be referred to as a treatment plan. The dental practitioner generates a 3D model according to the treatment plan. Then, a mold is made using the 3D model and a 3D printing method (e.g., stereolithography (SLA), fused deposition modeling (FDM) or digital light processing (DLP)). An aligner may be thermoformed over the mold. In the process, a sheet of material is heated and becomes pliable. The material contains uncrosslinked polymer chains. Pressure is then applied to the sheet to make the sheet have a shape that conforms to the mold. The sheet is transformed into a shell-shaped aligner.

Although the 3D printing and thermoforming methods enable rapid production, they also involve complicated processes. For example, the fabrication of the mold needs demolding, cutting, and trimming procedures, while the fabrication of the aligner requires cutting, trimming, and polishing procedures. In addition, treatments of some orthodontic cases need an aligner with a mechanical attachment, especially an attachment that is added to the aligner. An aligner with such an attachment is difficult to make through thermoforming directly. Consequently, the attachment is prefabricated, e.g., by injection molding, and then attached to the aligner by bonding, which further increases the complexity and cost of the process.

The aforementioned problems may be mitigated by forming aligners directly through 3D printing. Since molds are no longer needed, fabrication processes are simplified. Further, 3D printing may produce complex attachments and structures for aligners.

3D-printed aligners, made of polymeric materials, may contain residual monomers that may leach out over time in a water environment and cause biocompatibility issues. In addition, when an aligner absorbs water, it may have detrimental effects on the structure of the aligner. To prevent such issues, various structures and methods are provided for aligners. Besides aligners, the structures and methods may also be utilized for making other suitable dental appliances, for example, retainers. The dental appliance may be shell-shaped, cross-shaped (such as rapid palate expander), partly shell-shaped with non-shell-shaped attachment or accessories (such as a clear aligner with a solid button-like traction attachment for more efficient teeth movement), etc., as desired. Same or different materials/methods may be used to form different dental appliances.

Figure 1B:
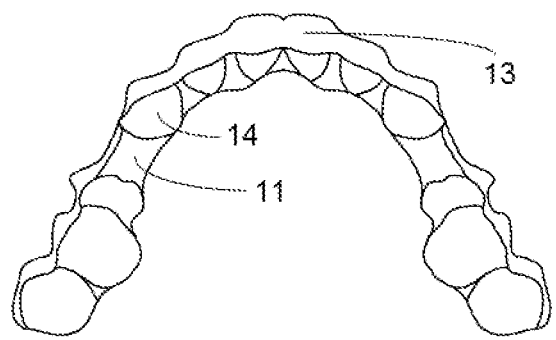

FIGS. 1A and 1B show a schematic view from a side and a schematic bottom view of an exemplary aligner base 10 in accordance with various embodiments of the present disclosure. The base 10 is made by 3D printing and contains cavities and some solid functional components, such as a solid connection component 11 and a solid hook-shaped component 12. As aforementioned, solid functional components like the connection component 11 and hook-shaped component 12 are difficult to make through the thermoforming method. The cavities are formed in polymeric shells and designed to receive a patient's teeth. The solid functional components may be used to exert forces on the jaw of the patient. The shells and solid functional components are integrated together by 3D printing. The base 10 has an external surface 13 and an internal surface 14. The base 10 may be referred to as a shell-shaped structure, as its main structure includes the shells. In some cases, a dental appliance (e.g., an aligner) may only contain teeth-receiving cavities and not contain any solid functional components. In some other cases, a dental appliance may contain teeth-receiving cavities and one or more solid functional components, such as that shown in FIGS. 1A and 1B. Optionally, a dental appliance may only contain one or more solid functional components and not contain any teeth-receiving cavities. In descriptions below, dental appliances containing teeth-receiving cavities are used exemplarily. These exemplary dental appliances are shell-shaped and do not have solid functional components. The methods described below apply to all dental appliances with a variety of structures.

In various embodiments, exemplary aligners may include a base and one or more functional coating layers deposited over the base. Details of the base and functional coating layer are illustrated in descriptions below.

Figure 1C:
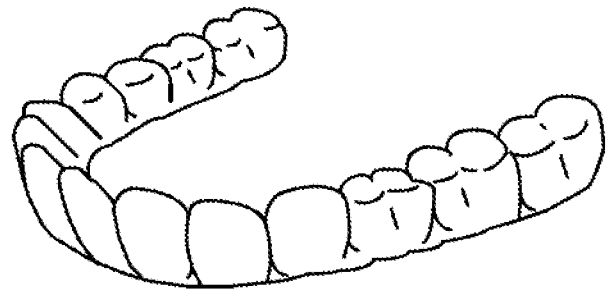
FIG. 1C illustrates a perspective view of an exemplary aligner base in accordance with various embodiments of the present disclosure.

FIG. 1C shows a perspective view of an exemplary aligner base 100. In some cases, aligners may have a base and one or more coating layers covering the base. In some other cases, aligners may have a base without any coating layer. In the following descriptions, aligners include one or more coating layers. Compared with a base without any coating layer, a base with a coating layer may be designed differently in some aspect. Exemplarily, a base with a coating layer may be configured smaller than a base without any coating layer. Optionally, a base with a coating layer may have the same dimensions as a base without any coating layer.

FIG. 1C illustrates the base 100 before a coating layer is deposited. The base 100 is transparent and may be made by various 3D printing techniques involving, for example, DLP, stereolithography (SLA), liquid crystal display (LCD), continuous liquid interface production (CLIP), material jet (e.g., ink jet or polyjet), or FDM. An STL model is often used in the 3D printing techniques as needed. For example, the STL model may be created before any printing process according to a treatment plan of a patient.

In one embodiment, a DLP process may be performed to form the base 100. The STL model may be converted into multi-layer two-dimensional (2D) patterns in the Z-axis direction. Beams of light with the 2D pattern are projected from a DLP projector onto a surface of a vat of liquid photopolymer resin. In some cases, the liquid photopolymer resin may include monomers (e.g., isobornyl acrylate, 2-hydroxyethyl methacrylate, and tripropylene glycol diacrylate (TPGDA)), oligomers (e.g., polyurethane acrylate, polyester acrylate, epoxy acrylate), and photoinitiators (e.g., 2,4,6-trimethylbenzoyldiphenyl phosphine oxide (TPO)).

For example, the liquid photopolymer resin may contain 25% of trifunctional aliphatic urethane acrylate oligomer, 45% of isobornyl acrylate, 28% of tripropylene glycol diacrylate, 1.8% of phenylbis(2,4,6-trimethylbenzoyl)phosphine oxide, 0.1% of phenol, 2-(2H-benzotriazol-2-yl)-4,6-bis(1-methyl-1-phenylethyl), and 0.1% of butylated hydroxytoluene, with the percentage in weight based on the weight of total liquids.

In some cases, the liquid photopolymer resin may contain 30% of aliphatic urethane acrylate, 38% of isobornyl acrylate, 22% of 2-hydroxyethyl acrylate, 8.5% of polyethylene glycol diacrylate, 1.3% of phenylbis(2,4,6-trimethylbenzoyl)phosphine oxide, 0.05% of 2,5-bis(5-tert-butyl-benzoxazol-2-yl)thiophene (BBOT), and 0.15% of monomethyl ether hydroquinone (MEHQ), with the percentage in weight based on the weight of total liquids.

In some cases, the liquid photopolymer resin may contain 50% of difunctional aliphatic polyether urethane methacrylate, 10% of aliphatic urethane dimethacrylate, 10% of N,N-dimethylacrylamide, 28% of tricyclo [5.2.1.0$^{2,6}$]decanedimethanol diacrylate, 1.5% of 2-hydroxy-2-methyl-1-phenyl-propan-1-one, 0.3% of N-nitroso-N-phenylhydroxylamine aluminum salt, and 0.2% of 2-(2H-benzotriazol-2-yl)-4,6-bis(1-methyl-1-phenylethyl) phenol, with the percentage in weight based on the weight of total liquids.

The liquid photopolymer resin is then cured through the exposure of the light beams to form a solid layer. The solid layer is made of polymeric materials which are the copolymer of the aforementioned monomers and oligomers, e.g., containing acrylate-, epoxy- and/or urethane-based polymer segments. The photopolymerization occurs in the horizontal direction and the solid layer is formed with the same shape of the beam pattern. When the light beams irradiate onto the liquid photopolymer resin along a downward direction, the process is performed top-down. The solid layer is submerged into the liquid as the printing platform is lowered incrementally. When the beams irradiate onto the photopolymer resin along an upward direction, the process is bottom-up. The solid layer is pulled out of the vat as the printing platform is raised incrementally. Then new liquid photopolymer resin remaining in the vat enters the gap between the solid layer and the bottom of the vat after the solid layer moves up, and the new liquid photopolymer resin is exposed and cured again to form another solid layer bonded with the previous layer. The process repeats until the base 100 is formed. Thus, the base 100 contains stacked solid layers of polymeric materials. In some cases, after the photopolymer resin is cured, there are still some photoinitiators that remain unreacted. For example, up to 10% of the photoinitiators may remain unreacted by accident in some cases. In some other cases, about 1% of the photoinitiators may remain unreacted after a post cure process. The unreacted photoinitiators may be used as an indicator to indicate the base 100 is made by photopolymerization.

The photopolymer resin may also be referred to as photocurable resin. After the photopolymer resin is cured, it becomes a thermosetting polymeric material made of 3D polymer networks. The 3D polymer network may include repeating units of, e.g., urethane groups, ester side groups, thioether groups, and/or alkyl groups.

In one embodiment, an SLA process may be performed to form the base 100. The STL model is transformed into multi-layer 2D patterns in the Z-axis direction. A beam of light traces one of the 2D patterns over the printing platform, curing the photopolymer resin where the beam is directed to. The exposed photopolymer resin forms a solid layer with the same shape of the 2D pattern. The beam size determines the printing resolution in the X and Y directions. For an ultraviolet laser with a wavelength of 405 nanometers, the beam width may be 140 micrometers in some cases. Similar to DLP, SLA may form solid layers bonded with one another in a top-down or bottom-up manner. The printing platform is moved incrementally, and a solid layer is formed with a corresponding 2D pattern at each increment. This process continues until the base 100 is created. In some cases, the photopolymer resin may contain 30% of urethane diacrylate, 20% of bisphenol-A epoxy diacrylate, 32% of isobornyl acrylate, 10% of N-vinyl pyrrolidone, 5.5% of tripropylene glycol diacrylate, 2% of 2,4,6-trimethylbenzoyldi-phenylphosphinate, 0.1% of 2,5-bis(5-tert-butyl-benzoxazol-2-yl)thiophene (BBOT), 0.3% of butylated hydroxytoluene (BHT), and 0.1% of organo-modified polysiloxane, with the percentage in weight based on the weight of total liquids.

In one embodiment, an LCD process may be performed to form the base 100. The LCD process is similar to the DLP process. The main difference is that DLP uses a projector to create a 2D pattern, while LCD uses an LCD screen to create a 2D pattern. Similar to DLP, the exposed photopolymer resin forms a solid layer with the same shape of the 2D pattern. The base 100 is made layer by layer, e.g., in a bottom-up manner.

In one embodiment, a CLIP process may be performed to form the base 100. The CLIP process is also similar to DLP. The major difference between them is CLIP has an oxygen-permeable membrane that creates a dead zone (i.e., persistent liquid interface) between the membrane and the polymerizing part. Instead of curing layer by layer, the photopolymerization process may be carried out continuously as the part is pulled out of the vat. Compared to DLP, the repeated up-and-down movement of the printing platform is eliminated, and the printing speed may be increased greatly.

In one embodiment, a material jet process may be performed to form the base 100. In the material jet process, a print head with single or multiple nozzles travels over a printing platform and jets droplets of photopolymer resin to selected locations. An ultraviolet light source immediately cures the sprayed photopolymer resin. After a 2D solid layer with a specific pattern is formed, the printing platform moves downward one layer height. The jetting and curing processes repeat until the base 100 is completed.

In one embodiment, an FDM process may be performed to form the base 100. In the FDM process, a printer melts a string or continuous droplets of thermoplastic material (e.g., bisphenol A (BPA)-free polyethylene terephthalate glycol modified (PETG) grade). The printer then lays the melted string or droplets down onto a printing platform. Each layer is formed as a set of heated filament threads or droplets which adhere to threads or droplets below and around it. The base 100 is built in a layer-by-layer manner. As the thermoplastic filament or droplets does not need curing by light, an object made by FDM may not contain photoinitiators in some cases.

As the 3D-printed base 100 may have certain residual monomers that may leach out over time in a water environment and cause biocompatibility issues, a monomer-blocking coating layer may be formed on the base 100. Descriptions below are focused on coating layers that block monomers, have a waterproof function, and/or provide other functions.

Figure 2:
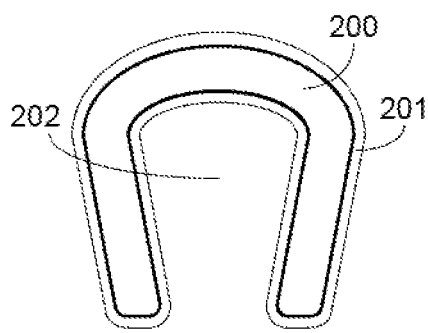
FIG. 2 illustrates a cross-sectional view of an exemplary clear aligner with a coating layer in accordance with various embodiments of the present disclosure.

FIG. 2 shows a cross-sectional view of an exemplary shell-shaped clear aligner 210 according to the present disclosure. The clear aligner 210 includes a base 200, a coating layer 201, and a cavity 202. The base 200 and coating layer 201 are biocompatible and transparent. The word "transparent", as used herein, may indicate the transmittance is at least 70% for visible light. The base 200 and cavity 202 may be designed for a patient by a treatment plan and produced through one of the above-illustrated 3D printing techniques. The base 200 may include one or more thermosetting polymeric materials in some embodiments. The cavity 202 is configured to receive the patient's teeth.

After the base 200 is made by 3D printing, additional operations such as a trimming, cutting, deburring, grinding, cleaning, or polishing operation may be performed. For example, supporting structures (e.g., sharp flanges) on the base 200 may be cut, and the surface residue left on the base 200 may be removed. The supporting structures on the base 200 may be removed by manual peeling, laser cutting, mechanical cutting, high-pressure fluid cutting, centrifugal method, high-frequency vibration, or any combination thereof. The surface residue on the base 200 may be removed by cleaning and polishing. Optionally, the surface residue on the base 200 may be removed by high-pressure gas purging, centrifugation method, solvent cleaning, or any combination thereof. In some cases, a post curing operation may be conducted at the base 200 to enhance the polymerization or photopolymerization process. The post curing operation may include curing with ultraviolet light and/or at elevated temperatures. Optionally, the base 200 may be cured in an inert gas environment or a liquid environment. The base 200 may also be cured after being coated with oxygen barrier agent.

The coating layer 201 functions as a barrier layer that prevents monomers from entering the oral cavity (i.e., the mouth) or blocks movements of monomers from the base 200 to the mouth. The coating layer 201 is deposited around the base 200 and surrounds the base completely. The surface of the cavity 202 may be referred to as the inner surface of the base 200 (or the aligner 210), while the surface opposite to the inner surface may be referred to as the outer surface of the base 200 (or the aligner 210). Optionally, the coating layer 201 may be formed to cover the whole surface, i.e., 100% of the inner and outer surfaces, of the base 200. Optionally, the coating layer 201 may cover a part of the surface, including the inner and outer surfaces, of the base 200. In some cases, the coating layer 201 may be formed over at least 50% of the inner surface and/or the outer surface of the base 200.

The coating layer 201 is a physical and diffusion barrier for monomers. The pore size and porosity of the coating layer 201 are small such that its permeability is low for monomers. The coating layer 201 may block movements of monomers and prevent monomers from leaching out of the aligner and entering the mouth.

Molecular weight cut off (MWCO) may be used to characterize the filtration or retention capabilities of a membrane or layer. In some embodiments, the MWCO of the coating layer 201 may be equal to or smaller than 2000 Daltons to block movements of monomers. As such, monomer release into the mouth may be hindered or reduced to a certain extent by the coating layer 201.

Optionally, besides blocking monomers, the coating layer 201 may also have a waterproof characteristic or waterproof function to shield the base 200 from water or at least reduce the base's contact with water. The word "waterproof", as used herein, indicates not allowing water to pass through to a certain extent and/or repelling water to a certain extent. For example, "waterproof" may indicate water vapor transmission rate (WVTR) is below 0.5 $g/m^2/h$ in some cases. When the coating layer 201 is waterproof, it reduces monomer leaching out from the base 200.

In some embodiments, besides blocking monomers, the coating layer 201 may contain hydrophobic materials that repel water. As a solid surface with low surface energy typically exhibits stronger water repellency and demonstrates higher hydrophobicity, the coating layer 201 may be made of a material whose surface energy is smaller than a predetermined value (e.g., 50 millijoules per square meter). Materials with relatively low surface energy include parylene, polyurea, fluoropolymer, polyurethane, acrylic, certain silicone materials, certain epoxy materials, certain ceramic materials, etc. These materials of low surface energy may be deposited over the surface of the base 200 to form a waterproof and monomer-blocking coating layer 201 in some cases.

In some embodiments, besides blocking monomers, the coating layer 201 may have a surface containing certain microscopic textures or nanostructures. The roughness caused by the microscopic textures or nanostructures may trap air or create pockets, which in turn repel water. For example, water droplets may sit on top of the surface without making direct contact, resulting in a hydrophobic effect. Optionally, the Ra (i.e., average roughness) of the surface of the coating layer 201 may be arranged in a range of 0.01 to 10 micrometers to repel water.

In some embodiments, besides blocking monomers, the coating layer 201 may have certain additives to decrease the surface energy or increase its hydrophobicity. The additives may modify the surface properties of the coating layer 201, enhance water repellency, and enhance hydrophobic characteristics of the coating layer 201. Exemplary additives may include hydrophobic particles or fillers, fluorinated additives, certain surface modifiers, certain crosslinking agents, certain anti-wetting agents, etc. The coating layer 201 may contain one or more types of these additives, e.g., within a range of 0.1% to 5% by weight of the coating layer. As such, the coating layer 201 may have a sufficient quantity of the additives to make an impact on the hydrophobicity of the coating layer. Meanwhile, the quantity of the additives may be arranged below a certain level so that the additives do not affect the layer's adhesion to the base of the dental appliance, mechanical durability, uniformity, transparency, and visual appearance.

The hydrophobic particles and fillers for additives may include certain nanoparticles (e.g., silica nanoparticles), microbeads, microspheres, carbon nanotubes, and/or polytetrafluoroethylene (PTFE) particles. The hydrophobic particles may increase the hydrophobicity of the coating layer 201 and thus enhance its water repellency.

The fluorinated additives may include fluorinated compounds, such as fluoropolymer additives (e.g., polytetrafluoroethylene dispersion), fluorosurfactants (e.g., perfluorooctyl acrylate), and perfluorinated compounds (e.g., perfluorooctyl triethoxysilane). These additives may lower the surface energy of the coating layer 201 and increase the hydrophobicity and water repellency.

The surface modifiers may include silane coupling agents and silicone-based surface modifiers that may enhance the hydrophobic properties of the coating layer 201. These modifiers may chemically bond to the surface of the coating layer 201, creating a hydrophobic layer and increasing the water repellency.

The crosslinking agents may include polyfunctional isocyanates (e.g., toluene diisocyanate), amino resins (e.g., melamine formaldehyde), and certain epoxy-functional crosslinkers. By promoting the crosslinking of polymer chains in the coating layer 201, these agents enhance the overall hydrophobicity. The waterproof properties and long-term performance of the coating layer 201 may be improved.

The anti-wetting agents may include certain polymer additives (e.g., polyethylene glycol (PEG)) and certain surfactants (e.g., silicone-based surfactants or polysiloxane surfactants). The anti-wetting agents may reduce the surface tension and thus prevent wetting by water. The additives help the coating layer 201 repel water and maintain its hydrophobic properties.

In some embodiments, the coating layer 201 may have a small pore size and limited porosity to restrict the movement of both monomers and water, and make it difficult for monomers to leach out and water to penetrate the coating layer 201. For example, the pore size of the coating layer 201 may be smaller than 500 nanometers and the porosity may be no more than 20% in some cases. In some other cases, the pore size and porosity may be smaller than 100 nanometers and 10%, respectively, which further enhances the monomer-blocking and waterproof functions. In some aspects, the pore size and porosity may be less than 10 nanometers and 2%, respectively. In certain embodiments, the coating layer 201 may exhibit an average pore size of 500 nm and a surface energy of 1 millijoule per square meter.

After the base 200 is made, the coating layer 201 may be deposited on the base by various techniques. The deposition techniques may include chemical vapor deposition (CVD), physical vapor deposition (PVD), dip coating, air spraying, airless spraying, electrostatic spraying, or any combination thereof. In some cases, the dip coating, air spraying, airless spraying, and electrostatic spraying methods include two operations. In the first operation, the base 200 is coated with a wet layer after being dipped into a liquid or sprayed by droplets of a liquid. In the second operation, the wet layer on the base 200 is cured and hardened, e.g., by ultraviolet light or elevated temperatures.

In some embodiments, parylene may be deposited on the base 200 by CVD. A parylene layer may be formed over the inner and outer surfaces of the base as the coating layer 201. The parylene layer may have the following exemplarily data. The thickness may be 15 micrometers, the surface energy may be 20-30 millijoules per square meter, the Ra (i.e., average roughness) may be 10-100 nanometers, the pore size may be smaller than 10 nanometers, and the porosity may be smaller than 10%. As such, the parylene layer may block monomers and prevent monomers from entering the mouth. In addition, the parylene layer has good waterproof properties. As the deposition of parylene does not involve photopolymerization, the parylene layer does not contain photoinitiators. In some aspects, the coating layer 201 may be a silicon carbide (SiC) layer. The SiC layer may be 20 micrometer thick exemplarily and formed on the base 200 by CVD. The SiC layer may prevent monomers from entering the mouth and is waterproof Both parylene and SiC are transparent and biocompatible. In some cases, when the coating layer 201 is deposited by CVD, the thickness of the coating layer 201 may be made relatively uniform over the inner and outer surface of the base 200, including certain pocket or recess regions. In some aspects, the ratio between the thickest part and the thinnest part of the coating layer 201 may be below a range of 1.5 to 2.

In some embodiments, the base 200 may be coated by certain silicone material using the dip coating technique. First, the base 200 is submerged into liquid silicone for some time. After the base 200 is pulled out, the silicone on the inner and outer surfaces is cured by ultraviolet light. The cured silicone becomes a silicone layer, i.e., the coating layer 201. As an example, alkoxy silicone may be used to produce the silicone layer. The silicone layer may prevent monomers from entering the mouth. Further, the silicone layer is waterproof, transparent, flexible, and biocompatible.

In some embodiments, the base 200 may be coated by certain epoxy using the air spraying technique. In the process, the liquid epoxy is sprayed onto the inner and outer surfaces of the base 200 by a spray coating system. Then, the epoxy is cured by ultraviolet light. The cured epoxy becomes an epoxy layer, i.e., the coating layer 201. Exemplarily, Master Bond UV18Med may be used to produce the epoxy layer. The epoxy layer may prevent monomers from entering the mouth and is waterproof, transparent, and biocompatible.

In some embodiments, the base 200 may be coated by certain polyurea using the air spraying technique. In some cases, a liquid polyurea material is made before air spraying. In the process, the liquid polyurea is sprayed onto the inner and outer surfaces of the base 200 by a spray coating system, forming a liquid polyurea layer. Optionally, the liquid polyurea layer may be hardened to become the coating layer 201 at room temperature. In some other cases, polyurea is formed by an isocyanate component and a synthetic resin blend component containing amine-terminated compounds. In the process, the liquid isocyanate and the synthetic resin are separately and simultaneously sprayed onto the inner and outer surfaces of the base 200 to form a coating layer by a spray coating system. Optionally, the coating layer may be cured at room temperature. The cured polyurea becomes a polyurea layer, i.e., the coating layer 201. The coating layer 201 made of polyurea blocks movements of monomers and is waterproof, transparent, and biocompatible.

In some embodiments, the coating layer 201 may include fluoropolymer materials such as polyvinylidene fluoride (PVDF), ethylene tetrafluoroethylene (ETFE), and polytetrafluoroethylene (PTFE). As aforementioned, a layer containing fluoropolymers may have relatively low surface energy and repel water. When the coating layer 201 is a fluoropolymer layer, it may have both the waterproof and monomer-blocking functions.

In some embodiments, the coating layer 201, as formed by the above-illustrated methods and materials, may be waterproof with a WVTR that is equal to or smaller than 0.5 $g/m^2/h$ exemplarily. In some cases, before the coating layer 201 is deposited, certain operations such as cleaning, roughening the base 200, and chemical etching or plasma treatment may be performed to promote strong adhesion.

Figure 3:
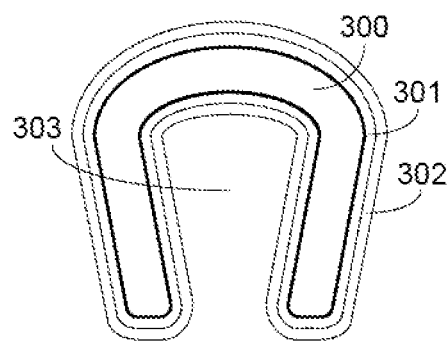
FIG. 3 illustrates a cross-sectional view of an exemplary clear aligner with coating layers in accordance with various embodiments of the present disclosure.

FIG. 3 shows a cross-sectional view of an exemplary shell-shaped clear aligner 310 with coating layers according to the present disclosure. The clear aligner 310 contains a shell-shaped base 300, a first coating layer 301, a second coating layer 302, and a cavity 303. The base 300 and first and second coating layers 301 and 302 are biocompatible and transparent. The 3D shell-shaped base 300 and the cavity 303 are designed for a patient corresponding to a treatment plan, and produced through one of the above-described 3D printing techniques. In some embodiments, the base 300 may include one or more thermosetting polymeric materials. After the base 300 is made, one or more additional operations such as a trimming, cutting, deburring, grinding, cleaning, polishing, and post curing operation may be performed. The additional operations remove supporting structures and surface residue on the base 300 and further cure the base.

The first and second coating layers 301 and 302 are configured to provide certain functions. The first coating layer 301 is deposited around the base 300 and surrounds the base at least partially. In some cases, the first coating layer 301 covers the whole surface, including the inner and outer surfaces, of the base 300 (or the aligner 310). Optionally, the first coating layer 301 may cover a part of the surface, including the inner and outer surfaces, of the base 300 (or the aligner 310). In some cases, the first coating layer 301 may be formed over at least 50% of the inner surface and/or the outer surface of the base 300. The second coating layer 302 is deposited over the surface of the first coating layer 301. Thus, the first coating layer 301 is between the base 300 and the second coating layer 302. In some cases, the second coating layer 302 is formed over the inner surface and outer surface of the base 300 and surrounds the base 300 and the first coating layer 301. Optionally, the second coating layer 302 may cover the whole exposed surface of the first coating layer 301, including the inner surface in the cavity 303 and the outer surface on the exterior of the aligner 310. Optionally, the second coating layer 302 may cover a part of the exposed surface of the first coating layer 301, including the inner surface in the cavity 303 and the outer surface on the exterior of the aligner 310.

In some embodiments, the first coating layer 301 may have a monomer-blocking structure that prevents monomers from entering the mouth. For example, the first coating layer 301 may be the same as or similar to the coating layer 201 as described above. Further, the first coating layer 301 may also have a waterproof characteristic or waterproof function to shield the base 300 from water or at least reduce the base's contact with water.

In some embodiments, the second coating layer 302 may be waterproof to shield the first coating layer 301 and the base 300 from water. That is, the second coating layer 302 may have a waterproof characteristic or waterproof function. For example, if the first coating layer 301 is a parylene layer, the second coating layer 302 may be a SiC layer, a silicone layer, an epoxy layer, or a fluoropolymer layer similar to that illustrated above. Optionally, the second coating layer 302 may include a particle, filler, additive, modifier, or agent that enhances the hydrophobic characteristic of the second coating layer 302.

Optionally, the second coating layer 302 may have additional functions that help protect a patient's teeth or improve conditions of the patient's teeth. For example, the second coating layer 302 may have an antibacterial, anti-caries, and/or whitening function.

Similar to the formation of the coating layer 201, the methods of making the first and second coating layers 301 and 302 may include CVD, PVD, dip coating, air spraying, airless spraying, electrostatic spraying, or any combination thereof. Further, the materials and structures of the first coating layer 301 may be the same as or similar to that of the coating layer 201 as describe above. The materials and structures of some of the second coating layer 302 may also be the same as or similar to that of the coating layer 201 in some aspects.

In some embodiments, poly(chloro-para-xylylene) may be deposited as the second coating layer 302 by CVD. The poly(chloro-para-xylylene) layer is formed over the first coating layer 301. The deposition process involves polymerization of 4-Methylbenzyl chloride radicals. The deposition process is also known as initiated chemical vapor deposition (iCVD). The poly(chloro-para-xylylene) layer may be 20 micrometer thick exemplarily. As the poly(chloro-para-xylylene) layer enables an antibacterial and biocompatible surface, the clear aligner 310 may have a first coating layer 301 that blocks monomers and a second coating layer 302 that provides certain antibacterial functionality. Furthermore, as the poly(chloro-para-xylylene) layer blocks monomers and is waterproof, the base 300 may be coated by the poly(chloro-para-xylylene) layer only. In such cases, the base 300 has only one coating layer, i.e., the poly(chloro-para-xylylene) layer, which provides monomer-blocking, waterproof, and antibacterial functions.

In some embodiments, after the first coating layer 301 is formed, the second coating layer 302 may be deposited by dipping the aligner into a solution containing toluene diisocyanate-trimethylolpropane (TDI-TMP) prepolymer, ethyl acetate, and sodium monofluorophosphate (SMFP). Then, a TDI-TMP+SMFP layer as the second coating layer 302 is cured at the room temperature. The layer may be 30 micrometer thick in some cases. The TDI-TMP+SMFP layer has SMFP compound that has antibacterial and anti-caries functions. As such, the second coating layer 302 made of TDI-TMP+SMFP may provide antibacterial and anti-caries functions to protect the teeth, while the first coating layer 301 prevents monomers from entering the mouth. In addition, as the TDI-TMP+SMFP also blocks monomers and is waterproof, a single coating layer of TDI-TMP+SMFP may be formed over the base 300 that blocks monomers, and is waterproof, antibacterial, and anti-caries. In such cases, an individual monomer-blocking coating layer (e.g., the first coating layer 301) on the base 300 may not be needed.

In some embodiments, after the first coating layer 301 is formed, a solution composed of 90% of alkoxy silicone and 10% of urea hydrogen peroxide (UHP) (with the percentage in weight based on the weight of total liquids) is used to make the second coating layer 302. The solution may be applied on the surface of the first coating layer 301 by the air spraying technique. The second coating layer 302 is formed after a curing process by ultraviolet light. The thickness of the second coating layer 302 may be 25 micrometers exemplarily. UHP is an oxidizing agent that slowly releases urea and hydrogen peroxide. Hydrogen peroxide may cause a chemical reaction that dissolves the stains on teeth, thereby brightening the teeth. As the second coating layer 302 has UHP, it contains hydrogen peroxide. Hence, the second coating layer 302 has a teeth whitening function. Thus, the base 300 has two coating layers that block monomers and provide teeth whitening functions, respectively.

Figure 4:
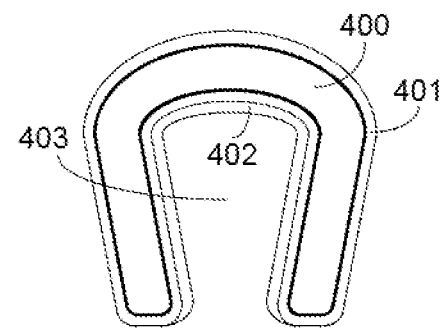
FIG. 4 illustrates a cross-sectional view of an exemplary clear aligner with coating layers in accordance with various embodiments of the present disclosure.

FIG. 4 shows a cross-sectional view of an exemplary shell-shaped clear aligner 410 with coating layers according to the present disclosure. The clear aligner 410 has a 3D shell-shaped base 400, a first coating layer 401, a second coating layer 402, and a cavity 403. The base 400 and first coating layer 401 are biocompatible and transparent. The second coating layer 402 is biocompatible and may be transparent or translucent with a white color. The base 400 and cavity 403 are designed for a patient according to a treatment plan, and produced through one of the above-described 3D printing techniques. In some embodiments, the base 400 may include one or more thermosetting polymeric materials. After the base 400 is made, one or more additional operations such as a trimming, cutting, deburring, grinding, cleaning, polishing, and post cure operation may be performed. The additional operations remove supporting structures and surface residue on the base 400 and cure the base further.

The first and second coating layers 401 and 402 are configured to provide predetermined functions. The first coating layer 401 is deposited around the base 400 and surrounds the base. In some cases, the first coating layer 401 may cover the whole surface, including the inner and outer surfaces, of the base 400. The second coating layer 402 is deposited over the surface of the cavity 403, i.e., over the inner surface of the base 400. Thus, the second coating layer 402 only covers part of the first coating layer 401. The covered part of the first coating layer 401 is between the base 400 and the second coating layer 402. The second coating layer 402 does not cover at least the majority of the first coating layer 401 on the outer surface of the clear aligner 410. In some cases, the second coating layer 402 is formed only over the inner surface the base 400 (or the aligner 410) and thus covers the first coating layer 401 only in the cavity 403.

The first coating layer 401 may block monomers and prevent monomers from entering the mouth. Further, the first coating layer 401 may also have a waterproof characteristic or waterproof function to shield the base 400 from water or at least reduce the base's contact with water. Optionally, the second coating layer 402 may have additional functions that help protect a patient's teeth or improve conditions of the patient's teeth. For example, the second coating layer 402 may have an antibacterial, anti-caries, and/or whitening function.

The fabrication methods of the first coating layer 401 may be the same as or similar to that of the coating layer 201. The methods of making the first coating layer 401 may include CVD, PVD, dip coating, air spraying, airless spraying, electrostatic spraying, or any combination thereof. Further, the materials of the first coating layer 401 may be the same as or similar to that of the coating layer 201. Optionally, the first coating layer 401 may include a first thin layer and a second thin layer (not shown). The first thin layer is formed over the base 400 and blocks movements of monomers, while the second thin layer is formed over the first thin layer and provides waterproof functions. In some cases, the first thin layer may have materials and structures the same as or similar to that of the first coating layer 301 as illustrated above and in FIG. 3. The second thin layer may have materials and structures the same as or similar to that of some of the second coating layer 302 that are waterproof.

After the first coating layer 401 is deposited on the base 400, the second coating layer 402 may be formed over the first coating layer 401 by CVD, PVD, dip coating, air spraying, airless spraying, electrostatic spraying, or any combination thereof. As the second coating layer 402 only or mainly covers the surface of the cavity 403, the outer surface of the aligner 410 may be covered temporarily during the operation when the second coating layer 402 is deposited. The opening of the cavity 403 is kept open in the operation. In some cases, the second coating layer 402 primarily provides an antibacterial, anti-caries, or whitening function. As such, the materials of the second coating layer 402 may be the same as or similar to that of some of the second coating layer 302. For example, the second coating layer 402 may be a PDMAMS layer, a TDI-TMP+SMFP layer, or a layer containing hydrogen peroxide.

There are several reasons for configuring the second coating layer only or mainly in the cavity 403. First, it is more effective to have the second coating layer 402 on the surface of the cavity 403, since only the surface of the cavity 403 directly contacts a patient's teeth. Second, it is less effective for the outer surface to assist an antibacterial, anti-caries, or whitening process, as the outer surface does not contact the patient's teeth directly. Further, if the second coating layer 402 is on the inner surface and not on the outer surface of the clear aligner 410, the second coating layer may not need to be transparent. Instead, the second coating layer 402 may be translucent with white color or even opaque with white color in some cases. For example, when the second coating layer 402 is opaque with white color, it does not affect the aesthetic appearance of the aligner 410 when a patient wears it. As such, more materials may be used to make the second coating layer 402, and more efficient antibacterial, anti-caries, and whitening functions may be provided.

Because of high glass transition temperature and high crosslink density, 3D printed aligner bases (e.g., the bases 200, 300, and 400) made by photopolymerization often have issues with high rigidity and limited ductility and toughness. To improve these issues, certain small molecules may be added to an uncured liquid resin. During and after a photocuring process, the small molecules remain unbound to the cured polymer network. Unlike small molecules bounded to a polymer network, the unbound small molecules may act as a "lubricant" that increases the free volume and thus the ability of chain motion in the polymer network. As such, the ductility and toughness of the polymer may be enhanced. The unbound small molecules, however, may bring some issues. If the unbound small molecules are not affinitive to the liquid resin or cured polymer, they may cause separation effects, such as separation from a substrate or premature phase separation upon mixing or polymerization. For example, when incompatible solvents or diluents are added to a liquid resin, phase separation can occur. The liquid resin can separate into layers, and a solid polymer can become opaque.

In addition, the unbound small molecules tend to migrate and eventually separate and escape from the polymer over time (e.g., several days or longer). Consequently, when there are residual monomers (i.e., unbound monomers) in a polymer, the residual monomers are often treated as detrimental elements and thus are eliminated through post-processing steps. In some other cases, when certain nonreactive solvents are used to homogenize a raw material, the solvents are often removed after 3D printing. Further, as illustrated above, some monomers may also cause safety concerns when the monomers leak out of an aligner and enter a patient's mouth.

For small molecules to be added to an uncured liquid resin, the small molecules should be affinitive to both the liquid resin and cured polymer, or soluble in the liquid resin and compatible with the cured polymer. As such, separation incidences may be reduced or prevented. Further, in some embodiments, a coating layer may be used to block the small molecules from escaping from an aligner base and keep them in the base. Details about adding the small molecules to a base are illustrated in descriptions below.

In some embodiments, small molecules added to a liquid resin may be additives that do not participate in photopolymerization, such as nonreactive diluents. These nonreactive small molecules are inherently unbound small molecules and may feature high mobility and remain in the polymer after photocuring reactions.

In some other embodiments, the small molecules may be reactive compounds, e.g., certain monomers such as photoinitiators. Through manipulating the light exposure dose and avoiding overexposure, while most of the monomers are polymerized to form polymer networks, a small portion of the monomers are not depleted during the 3D printing and subsequent post-curing processes. The unreacted residual monomers are unbound to the polymer networks. In some cases, if extra monomers are added to a liquid resin, more monomers may remain unreacted when the curing time or exposure dose is not increased. The extra amount of monomers may be a value beyond a predetermined amount of monomers needed for conventional photopolymerization.

Assuming small molecules are added to an aligner base, such as the base 200, 300, or 400. As the small molecules show propensity to escape or evaporate from the base, a coating layer may be formed over the base. The coating layer, as a barrier to prevent the small molecules from escaping, may be the same as or similar to the above-described layer 201, 301, or 401. As aforementioned, the barrier effect may be determined by the porosity, thickness, and surface energy of the coating layer.

In some embodiments, small molecules may also be added to polymer networks after a 3D printing process. For example, a 3D printed base may be immersed into a liquid or vapor of a compound for the base to absorb the compound (i.e., small molecules) to become more ductile or tough. Such a method may be as effective as that in which small molecules are added to an uncured liquid resin.

In some embodiments, nonreactive diluents compatible with a 3D printing resin may be selected as the small molecules and added to an uncured liquid resin. For example, for certain resins with high polarity, ethanol, N,N-dimethylformamide, and ethylene glycol may be used as the small molecules. For certain resins made of nonpolar components, toluene and hexane may be selected as the small molecules. If some resins have medium polarity, these resins may be compatible with a broad spectrum of nonreactive diluents, including both polar and nonpolar ones.

In some embodiments, monomers bearing functional groups that participate in radical polymerization may be used as the small molecules to improve ductility and toughness of a base. The functional groups may include the vinyl group, (meth)acrylate group, epoxy group, thiol group, and allyl group.

As illustrated above, small molecules to be added to an uncured liquid resin include nonreactive diluents. Exemplary nonreactive diluents may include water, ethanol, isopropyl alcohol, acetone, N,N-dimethylformamide, methyl ethyl ketone, ethylene glycol, glycerol, ethyl ether, triethyl amine, acetic acid, acetic anhydride, ethyl acetate, toluene, pentane, hexane, triethylene glycol, etc.

As aforementioned, small molecules to be added to an uncured liquid resin include certain monomers. Exemplary monomers include methyl acrylate, butyl acrylate, hexanediol diacrylate, 2-ethylhexyl acrylate, 4-tert-butylcyclohexyl acrylate, 2-hydroxyethyl methacrylate, acrylic acid, N-vinylpyrrolidone, vinyl methyl oxazolidinone, 4-acrylolmorpholine, cyclic trimethylolpropane formal acrylate, isobornyl acrylate, tetrahydrofurfuryl acrylate, diethylene glycol diacrylate, tripropylene glycol diacrylate, N,N-dimethyl acrylamide, 2-hydroxyethyl acrylamide, vinyl acetate, tri(ethylene glycol) divinyl ether, 3-ethyl-3-hydroxymethyl oxetane, styrene, 4-tert-butylstyrene, 4-acetoxystyrene, 1,6-hexanedithiol, etc.

As mentioned, the material of an aligner needs to be ductile and tough. For example, the elongation at break needs to exceed 60% to ensure the aligner does not break during a removal process, when the aligner is stretched.

In some embodiments, when nonreactive diluents (or small molecules) are added to an uncured liquid resin, the nonreactive diluents may account for 0.5% to 10% of the total weight of a base. When the nonreactive diluents are less than 0.5% of the total weight of a base, the material may be too brittle to meet the aligner requirement. When the nonreactive diluents are over 10% of the total weight, the elongation at break may suffer from a sudden drop, accompanied by a loss of Young's modulus. In other words, the material may become soft, easy to break, and unsuitable for aligners.

In some embodiments, when unbound monomers are used to improve the mechanical property of a base, the monomers may account for 0.5% to 10% of the total weight of a base. Similar to the nonreactive diluents, when the amount of residual monomers is lower than 0.5%, the material is too brittle. When the amount of residual monomer is higher than 10%, the material may become soft and easy to break. In either case, the material is unsuitable for aligners.

In some embodiments, the amount of unbound residual monomer may be tuned by manipulating the light exposure dose of the 3D printing and post-curing processes. Less exposure dose may leave more residual monomers.

Therefore, an aligner base (e.g., the base 200, 300, or 400) may be formed with a certain amount of unbound small molecules to improve its ductility and toughness. The aligner base may be coated with a coating layer (e.g., the layer 201, 301, or 401) to prevent the small molecules from escaping and maintain the improved mechanical property. Optionally, another functional layer (e.g., the layer 302 or 402) may be deposited over the coating layer that may provide an antibacterial, anti-caries, and/or whitening function. Descriptions below illustrate some exemplary aligner bases with unbound small molecules.

For example, an exemplary polymer base may be made by the DLP technique. The liquid photopolymer resin may contain 35% of trifunctional aliphatic urethane acrylate oligomer, 35% of isobornyl acrylate, 20% of hexanediol diacrylate, 8% of tripropylene glycol diacrylate, 1.8% of phenylbis(2,4,6-trimethylbenzoyl)phosphine oxide, 0.1% of phenol, 2-(2H-benzotriazol-2-yl)-4,6-bis(1-methyl-1-phenylethyl), and 0.1% of butylated hydroxytoluene, with the percentage in weight based on the weight of total liquids.

After photopolymerization, the base contains unreacted monomers (e.g., (meth)acrylate monomers). The amount of the unreacted escapable monomers may be tuned by manipulating the light exposure dose of the 3D printing and post-curing processes. Optionally, the base may be coated with a layer of polyurea by air spray coating. The layer thickness may be 0.08 mm exemplarily. The mechanical property of the base may be tested by uniaxial tensile.

Figure 5A:
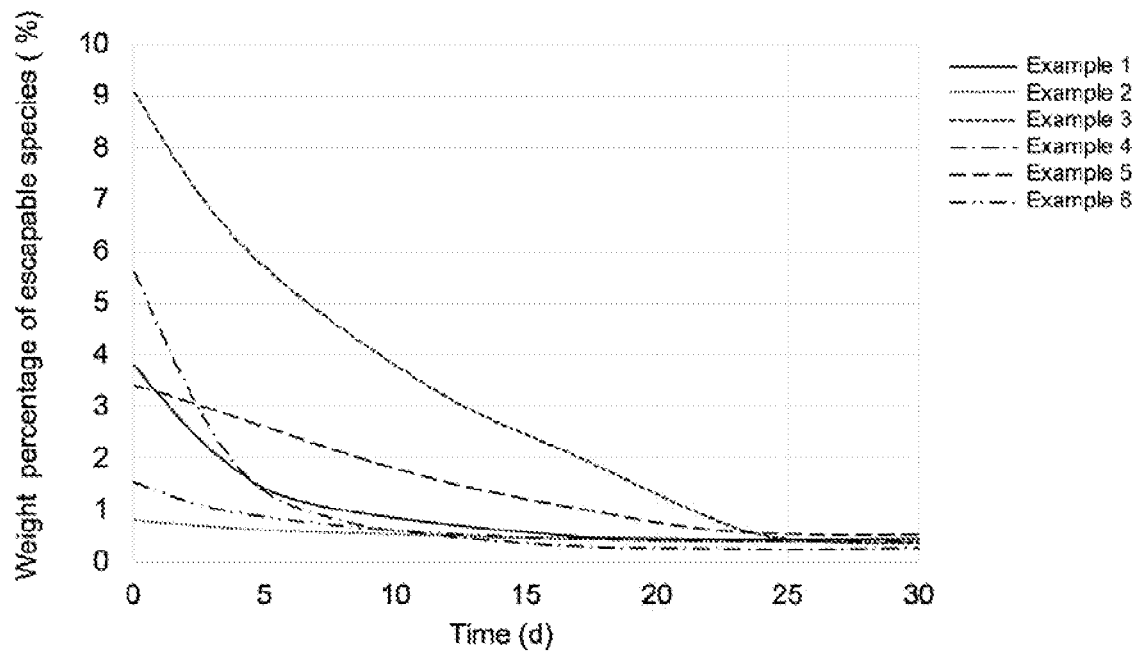
FIGS. 5A and 5B illustrate weight loss diagrams of small molecules in accordance with various embodiments of the present disclosure.
Figure 5B:
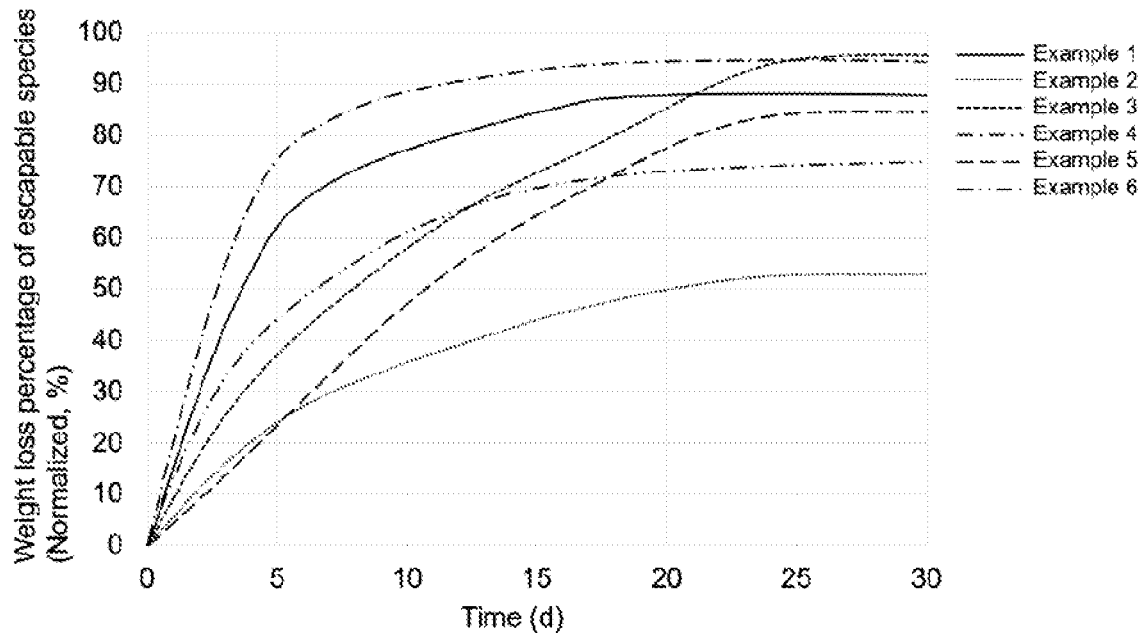

FIGS. 5A and 5B show weight loss diagrams of the small molecules in accordance with the present disclosure. Assuming the base is not coated with any layer. Since the small molecules are escapable, the weight of the small molecules declines with time. As shown in FIGS. 5A and 5B, curves representing six examples are presented. For the exemplary polymer base, monomer weight loss results are illustrated by example 1 in both figures. The weight change of monomers may be determined by measuring the weight change of the base. The weight of the base is 1.45 g. The initial weight of unreacted monomers in the base is 0.0550 g. The weight of the unreacted monomers is 3.8% of the base weight. The weight and weight percentage of the unreacted monomers decrease to 0.0064 g and 0.44% after 30 days, respectively. That is, the loss of weight of the unreacted monomers is 0.0486 g in 30 days. After this period, the percentage of weight loss of the unreacted monomers reaches 88.4%, as shown in FIG. 5B. Thus, a proper coating layer disposed on the base is needed to prevent small molecules from escaping and keep them in the base.

Figure 5C:
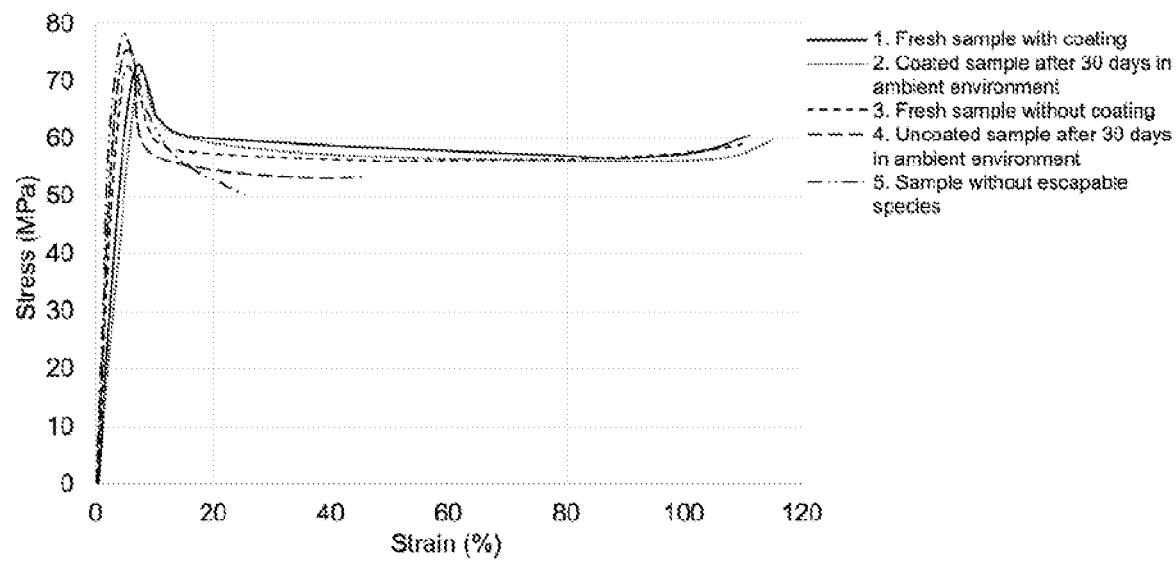
FIG. 5C illustrates a diagram of stress versus strain under different conditions in accordance with various embodiments of the present disclosure.

FIG. 5C shows a diagram of stress versus strain under different conditions in accordance with the present disclosure. When the base contains 3.8% unreacted monomers (by weight) and has the polyurea coating layer, the elongation at break is 110% at the beginning and 115% after 30 days in ambient environment. When the base contains 3.8% unreacted monomers (by weight) with no coating layer, the elongation at break is 108% initially and becomes 45% after 30 days being placed in ambient environment, indicating an embrittlement state driven by the loss of the unreacted monomers. When the base with 3.8% unreacted monomers is subjected to heating at 50° C. in a vacuum for 48 hours, the unreacted escapable monomers are removed from the base. Thereafter, the base is coated with a polyurea layer. The elongation at break of the base is 26%. Hence, the unreacted monomers are critical to make the base more ductile and tougher, and a proper coating layer keeps the monomers in the base to maintain the ductility and toughness.

Figure 6:
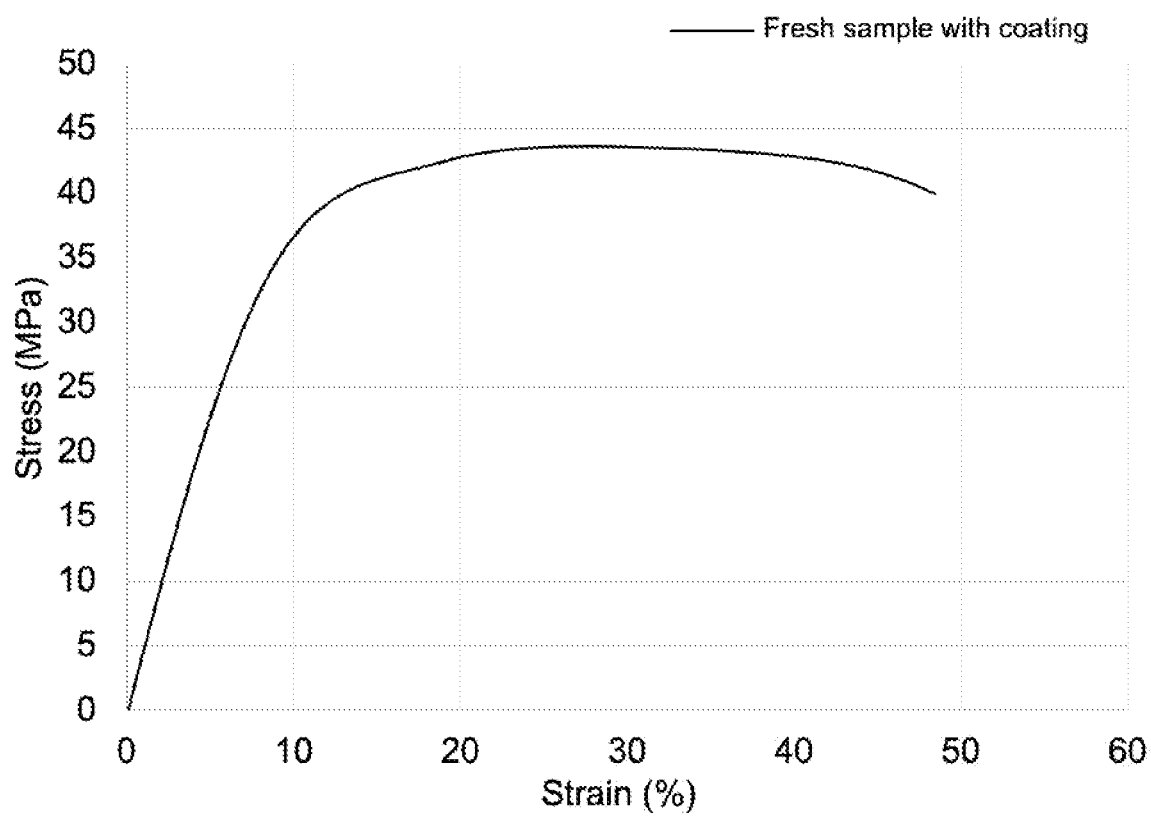
FIGS. 6, 7, 8, 9, 10, 11, and 12 illustrate diagrams of stress versus strain under different conditions in accordance with various embodiments of the present disclosure.

FIG. 6 illustrates a diagram of stress versus strain of an exemplary base in accordance with the present disclosure. The base may be made by photopolymerization from urethane acrylate oligomers and (meth)acrylate monomers. The unreacted monomers in the base accounts for 11.5% of the total weight. The base containing the monomers may be coated with a polyurea layer with 0.08 mm thickness by the air spray coating technique. The amount of the unreacted monomers in the base may be tuned by manipulating the light exposure dose of the 3D printing and post-curing processes. As shown in FIG. 6, the elongation at break of the base is 48%. Thus, excessive residual monomers in a base may cause a decrease of the elongation at break, making the base unsuitable for applications.

Figure 7:
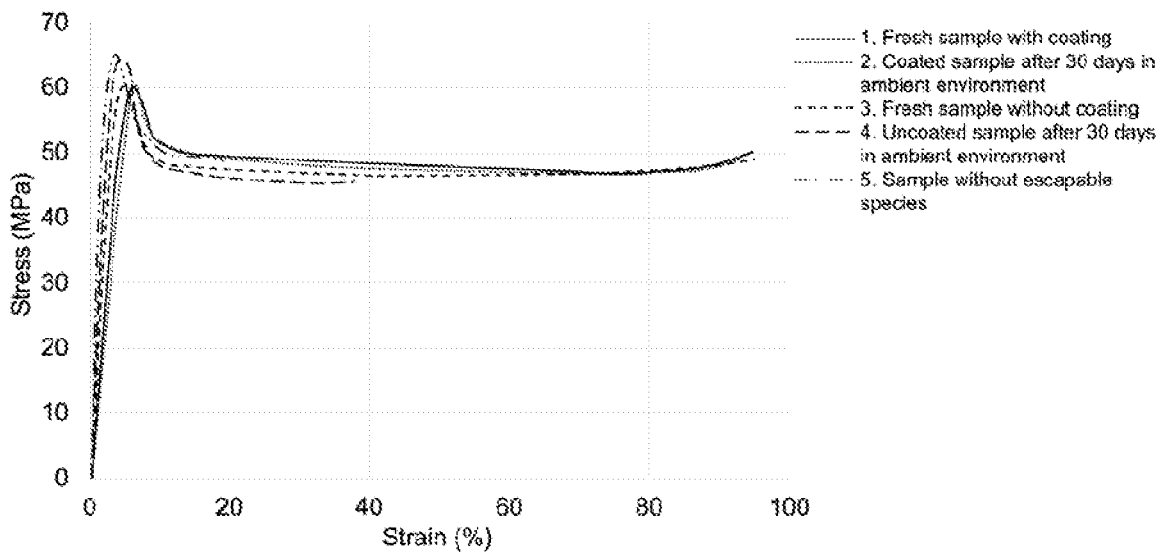

FIG. 7 illustrates a diagram of stress versus strain of an exemplary base under different conditions in accordance with the present disclosure. The polymer base may be photopolymerized from urethane acrylate oligomers, (meth) acrylate monomers and thiol monomers in a DLP process. For example, the liquid photopolymer resin may contain 50% of aliphatic urethane acrylate, 12% of tetrahydrofurfuryl acrylate, 11% of 4-tert-butylcyclohexyl acrylate, 18.5% of diethylene glycol diacrylate, 8% of 1,6-hexanedithiol, 1.3% of phenylbis(2,4,6-trimethylbenzoyl)phosphine oxide, 0.05% of 2,5-bis(5-tert-butyl-benzoxazol-2-yl)thiophene (BBOT), and 0.15% of monomethyl ether hydroquinone (MEHQ), with the percentage in weight based on the weight of total liquids.

The unreacted monomers may account for 0.80% of the total weight of the base. The base may be subsequently coated with a layer of parylene C by CVD. The thickness of the coating layer may be 20 μm exemplarily. As shown in FIG. 7, when the base contains 0.80% unreacted monomers (by weight) and has the coating layer, the elongation at break is 95% initially and after 30 days in ambient environment. When the base contains 0.80% unreacted monomers (by weight) and with no coating layer, the elongation at break is 95% initially and decreases to 37% after 30 days in ambient environment.

When the base with 3.8% unreacted monomers is subjected to heating at 50° C. in a vacuum for 48 hours, the unreacted escapable monomers are removed from the base. The base then is coated with a parylene C layer of 20 μm by CVD. The elongation at break of the base is only 19%.

The unreacted monomers may escape the base, if there is no coating layer covering the base. Referring to FIGS. 5A and 5B, weight loss of the monomers corresponds to example 2 in both figures. The weight of the base is 1.45 g. The initial weight and weight percentage of the unreacted monomers is 0.0116 g and 0.80% of the base. These values decrease to 0.0054 g and 0.37% after 30 days, respectively. Then, the loss of weight and weight loss percentage after 30 days are 0.0062 g and 53.4%, respectively.

Figure 8:
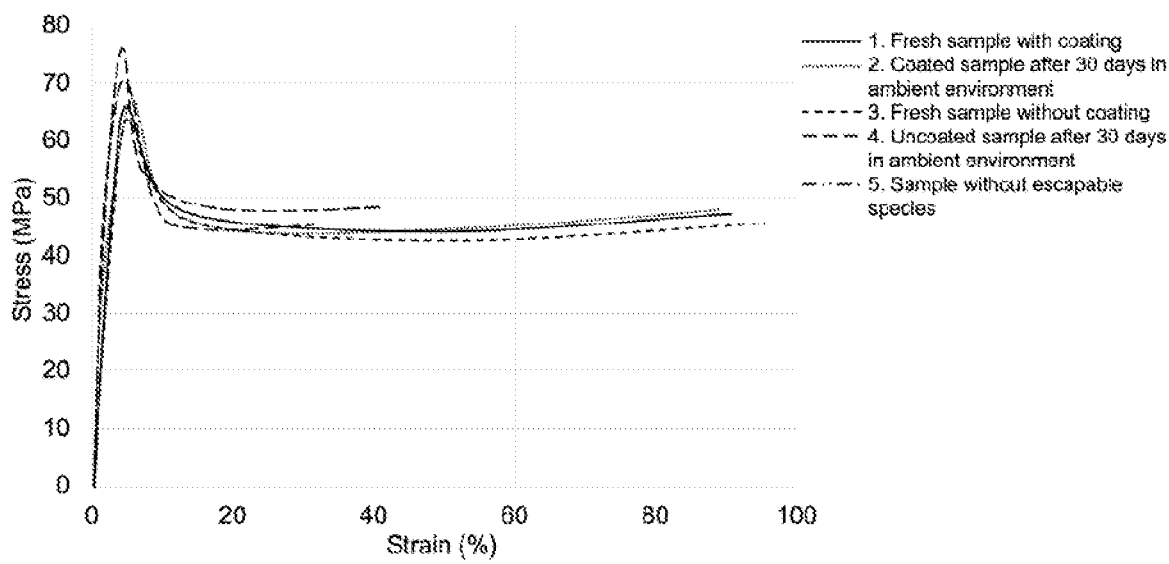

FIG. 8 illustrates a diagram of stress versus strain of an exemplary base under different conditions in accordance with the present disclosure. The base may be formed through an SLA process. The base contains polymers cured from photopolymerization and a nonreactive diluent. The liquid photopolymer resin may contain 40% of difunctional aliphatic polyether urethane methacrylate, 10% of aliphatic urethane dimethacrylate, 15% of 4-acryloylmorpholine, 10% of vinyl methyl oxazolidinone, 15% of tricyclo [5.2.1.0$^{2,6}$]decanedimethanol diacrylate, 8% of acrylic acid, 1.5% of 2-hydroxy-2-methyl-1-phenyl-propan-1-one, 0.3% of N-nitroso-N-phenylhydroxylamine aluminum salt, and 0.2% of 2-(2H-benzotriazol-2-yl)-4,6-bis(1-methyl-1-phenylethyl) phenol, with the percentage in weight based on the weight of total liquids. The base is photopolymerized from urethane acrylate oligomers and (meth)acrylate and vinyl monomers.

Since the formulation contains a large amount of polar monomers, ethanol may be chosen as a nonreactive diluent that is added to the liquid resin. The weight of the ethanol equals to 10% of the weight of the liquid resin (excluding the ethanol). So, the ethanol accounts for 9.1% of the total weight of the base.

The base may be coated with a layer of silicone material by dip coating. The layer thickness may be 0.05 mm. The elongation at break of the base is 92%. After 30 days in ambient environment, the elongation at break is almost unchanged, remaining at 88%.

When a base is formed with the same process and does not have a coating layer, it has the initial elongation at break of 96%. After 30 days under ambient condition, the elongation at break drops significantly to 41%. When the base is formed and coated through the same process, while ethanol is not added to the liquid resin, the base has the elongation at break of 32%.

When a coating layer is not formed on the base, the small molecules (i.e., the ethanol molecules) may escape the base. Referring to FIGS. 5A and 5B, weight loss of the small molecules corresponds to example 3 in both figures. The weight of the base is 1.45 g. The initial weight and weight percentage of the small molecules is 0.132 g and 9.1%. These values decrease to 0.0051 g and 0.35% after 30 days, respectively. Then, the loss of weight and weight loss percentage are 0.127 g and 96.1%, respectively.

Figure 9:
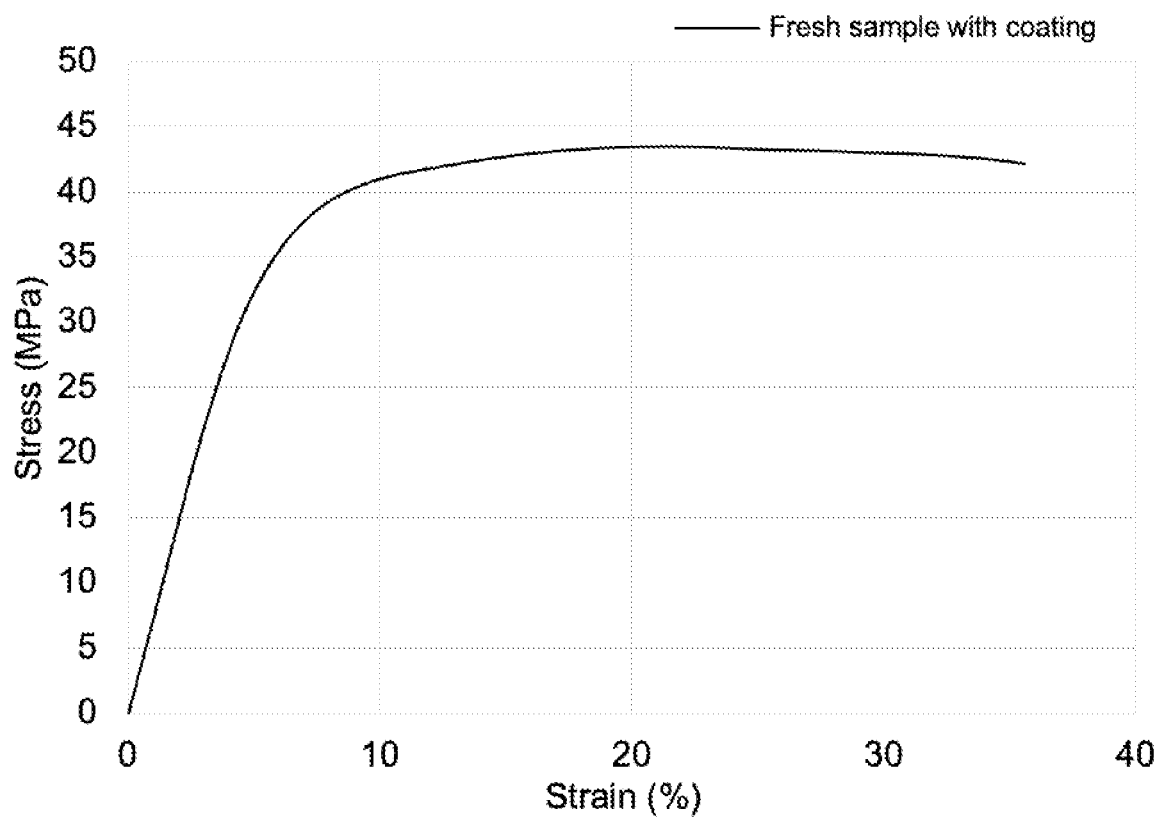

FIG. 9 illustrates a diagram of stress versus strain of an exemplary base in accordance with the present disclosure. The base is photopolymerized from urethane acrylate oligomers and (meth)acrylate and vinyl monomers. The liquid photopolymer resin may contain 40% of difunctional aliphatic polyether urethane methacrylate, 10% of aliphatic urethane dimethacrylate, 15% of 4-acryloylmorpholine, 10% of vinyl methyl oxazolidinone, 15% of tricyclo [5.2.1.0$^{2,6}$]decanedimethanol diacrylate, 8% of acrylic acid, 1.5% of 2-hydroxy-2-methyl-1-phenyl-propan-1-one, 0.3% of N-nitroso-N-phenylhydroxylamine aluminum salt, and 0.2% of 2-(2H-benzotriazol-2-yl)-4,6-bis(1-methyl-1-phenylethyl) phenol, with the percentage in weight based on the weight of total liquids.

Since the formulation contains a large amount of polar monomers, ethanol is chosen as the nonreactive diluent, whose weight equals to 15% of the weight of the liquid (excluding ethanol). So, the ethanol accounts for 13% of the weight of the base. The base may be coated with a layer of silicone material by dip coating. The layer thickness may be 0.05 mm.

As shown in FIG. 9, the elongation at break of the base is 36%, which is lower than the aligner standard of 60%. It indicates that excessive addition of small molecules in a base may lead to a decrease of elongation at break, rendering the base unqualified for use.

Figure 10:
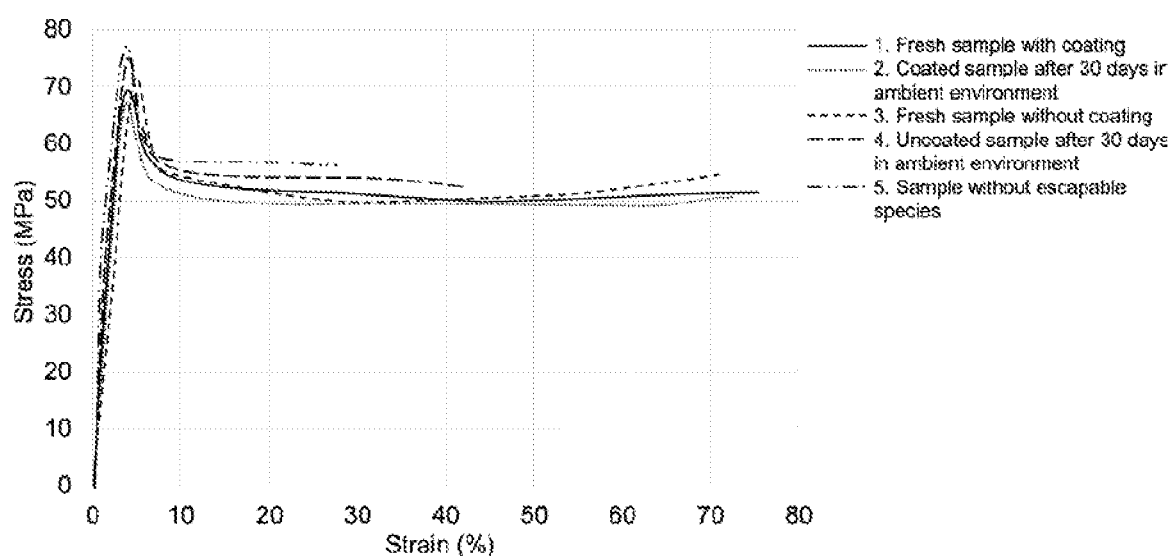

FIG. 10 illustrates a diagram of stress versus strain of an exemplary base under different conditions in accordance with the present disclosure. The polymer base is photopolymerized from urethane acrylate oligomers and (meth) acrylate and vinyl monomers. The liquid resin may contain 30% of urethane diacrylate, 22% of isobornyl acrylate, 10% of 2-(N,N-dimethylamino)ethyl acrylate, 10% of trimethylolpropane triacrylate, 25.5% of tripropylene glycol diacrylate, 2% of 2,4,6-trimethylbenzoyldi-phenylphosphinate, 0.1% of 2,5-bis(5-tert-butyl-benzoxazol-2-yl)thiophene (BBOT), 0.3% of butylated hydroxytoluene (BHT), and 0.1% of organo-modified polysiloxane, with the percentage in weight based on the weight of total liquids.

Because most of the monomers have low polarity, toluene is chosen as the nonreactive diluent to be added to the liquid resin, whose weight is 6% of the weight of the liquid (excluding toluene). So, the toluene accounts for 5.66% of the weight of the base. The base is coated with a layer of epoxy material using electrostatic spray coating. The layer thickness is 0.08 mm. The elongation at break of the base is 77%. After 30 days in ambient environment, the elongation at break is 74%.

When a base is formed through the same process but without a coating layer, it has the initial elongation at break of 72%. After 30 days under ambient condition, the elongation at break of the base significantly drops to 43%. When the diluent is not added to the liquid resin and a base is formed and coated through the same process, the base has the elongation at break of 27%.

When a coating layer is not formed on the base, the base loses the unbound small molecules. Referring to FIGS. 5A and 5B, weight loss of the small molecules corresponds to example 4 in both figures. The weight of the base is 1.45 g. The initial weight and weight percentage of the small molecules are 0.0821 g and 5.66%. These values decrease to 0.0042 g and 0.29% after 30 days, respectively. Then, the loss of weight and weight loss percentage are 0.0779 g and 94.9%, respectively.

Figure 11:
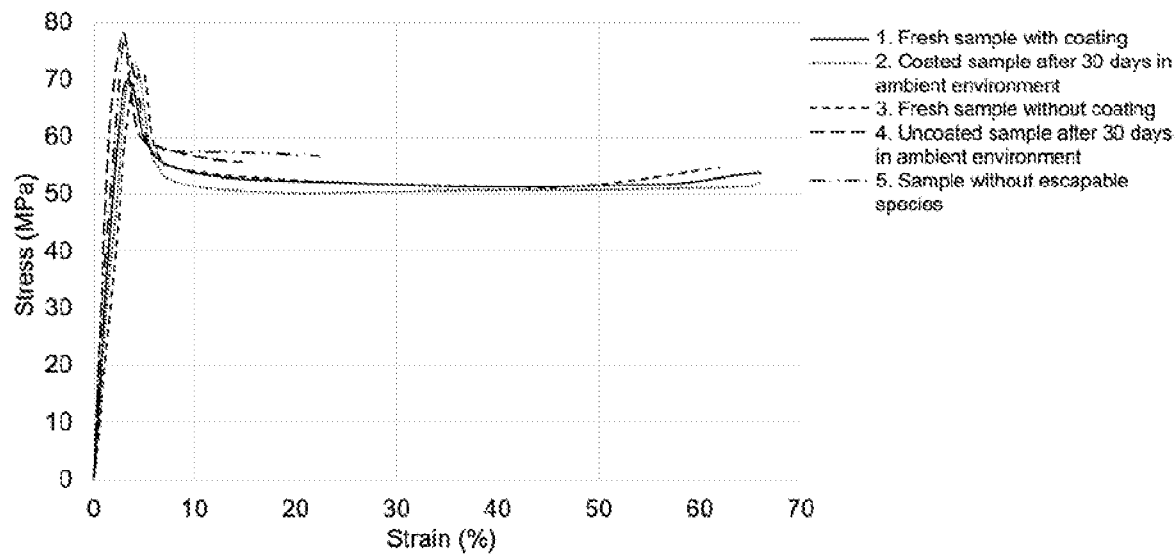

FIG. 11 illustrates a diagram of stress versus strain of an exemplary base under different conditions in accordance with the present disclosure. The base is photopolymerized from urethane acrylate oligomers and (meth)acrylate, epoxy monomers, and vinyl monomers through a DLP process. The liquid resin may contain 40% of diglycidyl ether of bisphenol A (DGEBA), 25% of aliphatic urethane acrylate oligomer, 8% of pentaerythritol tetraacrylate, 8% of tri(ethylene glycol) divinyl ether, 12.8% of 3-ethyl-3-hydroxymethyl oxetane (EHM), 2% of ethyl (2,4,6-trimethylbenzoyl) phenylphosphinate, 2% of cyclohexylphenyl iodonium hexafluoroantimonate, 1% of benzoin ethyl ether, 0.2% of hydroquinone, 1% of hindered amine light stabilizers (HALS), with the percentage in weight based on the weight of total liquids.

The base may absorb a certain amount of nonreactive diluents. For example, after 3D printing and post-curing, the base may be immersed in acetone for 3 minutes. The weight of the acetone absorbed in the base accounts for 3.4% of the total weight, which may be obtained from the difference of the base weights before and after the immersion step.

The base then is coated with a layer of silicone material via the airless spraying technique. The layer thickness is 0.10 mm. The elongation at break of the base is 67%. After 30 days in ambient environment, the elongation at break is still 67%.

When a base is formed through the same process but without a coating layer, it has the initial elongation at break of 63%. After 30 days under ambient condition, the elongation at break of the base significantly drops to 15%.

When the base is not immersed in acetone, and is directly coated with a silicone layer through airless spray, the elongation at break of the base is 23%.

When the coating layer is not formed on the base, the small molecules escape the base over time. Referring to FIGS. 5A and 5B, weight loss of the small molecules corresponds to example 5 in both figures. The weight of the base is 1.45 g. The initial weight and weight percentage of the small molecules are 0.0477 g and 3.4%. These values decrease to 0.0070 g and 0.48% after 30 days, respectively. Then, the loss of weight and weight loss percentage are 0.0407 g and 85.3%, respectively.

Figure 12:
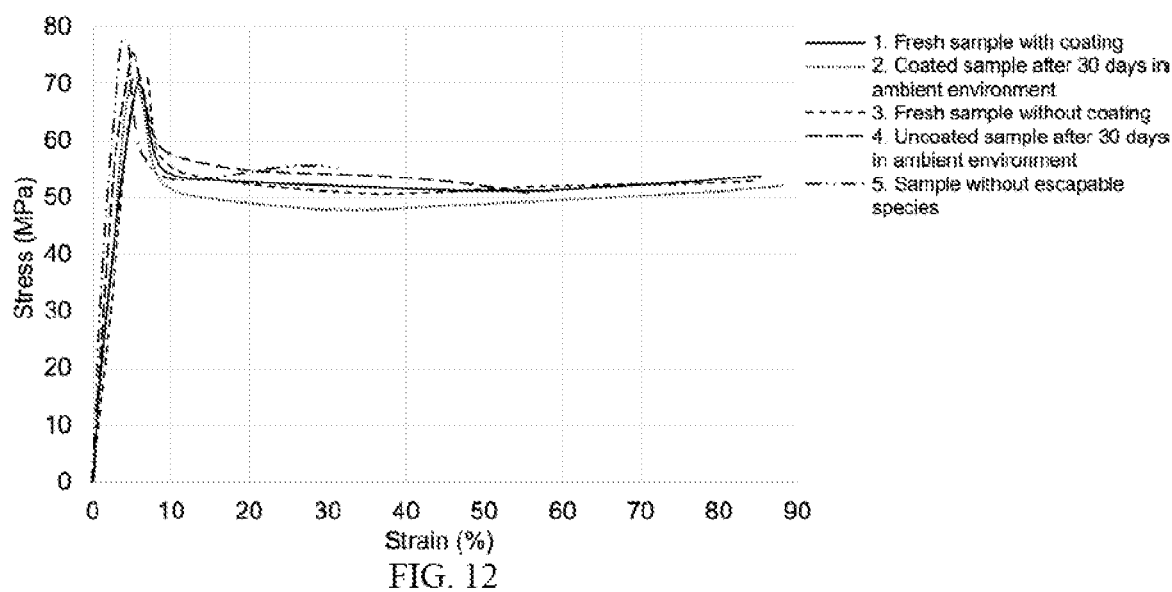

FIG. 12 illustrates a diagram of stress versus strain of an exemplary base under different conditions in accordance with the present disclosure. The polymer base is photopolymerized from urethane acrylate oligomers and (meth)acrylate. The liquid resin may contain 30% of urethane diacrylate, 32% of hydroxyethyl methacrylate, 20% of polyethylene diacrylate, 15% of trimethylolpropane triacrylate, 2.5% of 2,4,6-trimethylbenzoyldi-phenylphosphinate, 0.2% of 2-(2'-Hydroxy-3',5'-di-tert-butylphenyl)-5-chlorobenzotriazole, 0.3% of butylated hydroxytoluene (BHT), with the percentage in weight based on the weight of total liquids.

After 3D printing and post-curing, the base may be placed in a chamber where the relative humidity (RH) is 80% for 5 hours. The base absorbs water vapor in the air. The weight of water absorbed in the base accounts for 1.6% of the total weight of the base, which may be measured from the weight gain after the exposure.

Further, the base is coated with a layer of parylene C via CVD. The layer thickness is 0.02 mm. The elongation at break of the base is 85%. After 30 days in ambient environment, the elongation at break is 88%.

When a base is formed through the same process but without a coating layer, it has the initial elongation at break of 85%. After 30 days under ambient condition, the elongation at break of the base significantly drops to 56%.

When the base is not exposed to water vapor, but directly coated with a parylene C layer through CVD, the elongation at break of the base is 32%, remarkably lower than the value from the base exposed to water vapor.

When a coating layer is not deposited on the base, the small molecules escape the base over time. Referring to FIGS. 5A and 5B, weight loss of the small molecules corresponds to example 6 in both figures. The weight of the base is 1.45 g. The initial weight and weight percentage of the small molecules are 0.0230 g and 1.6%. These values decrease to 0.0059 g and 0.41% after 30 days, respectively. Then, the loss of weight and weight loss percentage are 0.0421 g and 74%, respectively.

Figure 13:
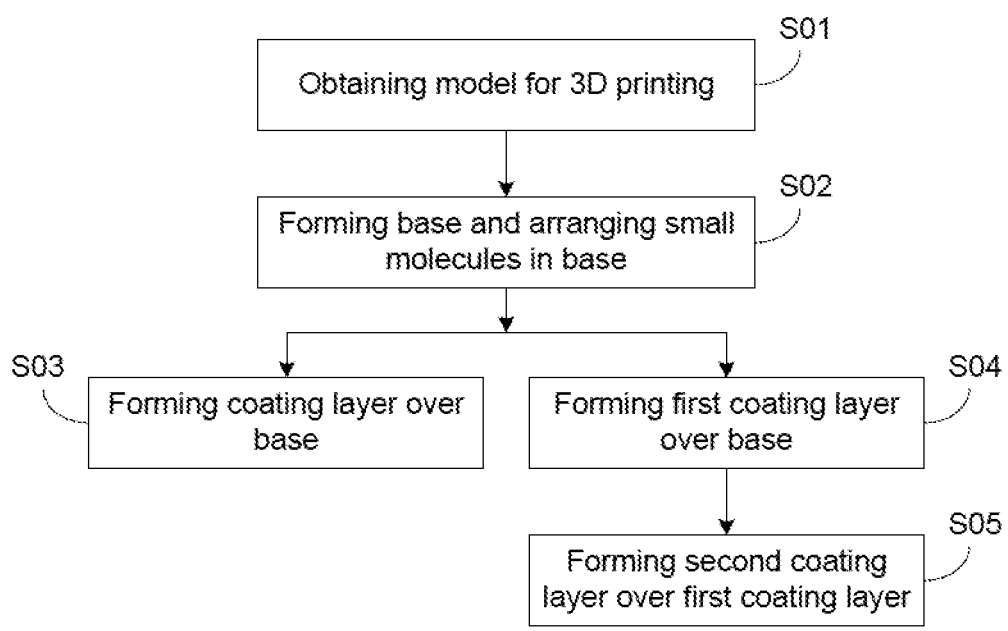
FIG. 13 illustrates exemplary methods for forming clear aligners with one or more coating layers in accordance with various embodiments of the present disclosure.

FIG. 13 shows a schematic flow chart to illustrate methods of fabricating clear aligners according to the present disclosure. At S01, an STL model of a patient is obtained. The STL model is created according to a treatment plan and used to make the clear aligner with a 3D shell-shaped structure. Optionally, the model may be converted into multi-layer 2D patterns in the Z-axis direction. The 2D patterns may be used for 3D printing in a layer-by-layer manner.

At S02, a base of the clear aligner (e.g., the base 200 as shown in FIG. 2) is formed using the multi-layer 2D patterns or the STL model. The 3D base is shell-shaped and may be made by, e.g., a 3D printing technique, with a polymerization or photopolymerization process. The 3D printing techniques may include DLP, SLA, LCD, CLIP, material jet, and FDM. The base contains polymeric materials with biocompatibility. After the base is fabricated, supporting structures and surface residue on the base may be removed by one or more additional operations such as a trimming, cutting, deburring, grinding, cleaning, and polishing operation. A post cure operation may be performed.

Further, unbound small molecules are added to the base to increase its ductility and toughness. The unbound small molecules may include nonreactive compound that do not participate in the photopolymerization process, such as nonreactive diluents. For example, a certain amount of the nonreactive diluents may be added to the liquid resin. The unbound small molecules may also include certain reactive compounds, e.g., unreacted residual monomers or photoinitiators. The amount of the unreacted monomers may be controlled by adjusting the light exposure dose of a 3D printing and a post-curing process. In some cases, the unbound small molecules may include both nonreactive compound and unreacted monomers that are added to the liquid resin. Further, the small molecules may be added to the base by immersing the base in a liquid or vapor of a compound for the base to absorb the compound (or the small molecules).

The unbound small molecules added to the base may account for 0.5% to 10% of the total weight of the base in order to improve the ductility and toughness of the base. That is, the ratio of the weight of the unbound small molecules to the weight of the base is larger than 0.005 and smaller than 0.1 in some embodiments. As the unbound small molecules may escape from the base, a layer may be deposited on the base to block movements of the small molecules and keep the small molecules in the base.

At S03, a coating layer (e.g., the coating layer 201 as shown in FIG. 2) is deposited over the inner and outer surfaces of the base. Deposition or coating techniques such as CVD, PVD, dip coating, air spraying, airless spraying, and/or electrostatic spraying may be employed to make the coating layer. The coating layer is made to block movements of the small molecules and prevent the small molecules from escaping. Optionally, the MWCO of the coating layer may be equal to or smaller than 2000 Daltons to block movements of small molecules. As the aforementioned unbound small molecules (e.g., nonreactive diluents and unreacted monomers) have a molecular weight below 2000 Daltons, a coating layer with MWCO smaller than 2000 Daltons may block movements of the unbound small molecules effectively. Optionally, the pore size of the coating layer may be smaller than 500 nanometers and the porosity may be smaller than 20% to block the small molecules. Additionally, the coating layer may have a waterproof function to protect the base from water. Optionally, the coating layer may contain hydrophobic materials that repel water. Optionally, the average roughness of the surface of the coating layer may be arranged within a range of 0.01 to 10 micrometers to repel water. Optionally, additives such as hydrophobic particles or fillers, fluorinated additives, certain surface modifiers, certain crosslinking agents, or certain anti-wetting agents may be added to the coating layer to increase the hydrophobicity.

Further, the coating layer may have one or more other functions to protect a patient's teeth in some cases. For example, the additional functions may include antibacterial, whitening, and anti-caries functions. In some embodiments, the functions are enabled by certain agents or compounds. For example, the coating layer may contain one or more of the following agents or compounds: a bacteriostatic agent that includes a compound capable of releasing radicals and groups that disrupt bacterial cell membranes, inhibit bacterial growth, or reduce bacterial colonization on a material surface; a teeth whitening agent including a compound that interacts with tooth stains or discolorations, aids in tooth stain removal, or lightens teeth; a fluoride compound that enhances tooth enamel strength; an antimicrobial agent that disrupts bacterial integrity; and a remineralizing agent that promotes enamel mineral replenishment.

In some cases, the coating layer may contain a first and a second thin layer. The first thin layer may be deposited over the surface of the base, and the second thin layer may be deposited over the surface of the first thin layer. A deposition method such as CVD, PVD, dip coating, air spraying, airless spraying, or electrostatic spraying may be used to grow the first and second thin layers. The first thin layer may be configured to block movements of the small molecules, while the second thin layer may be configured to have a waterproof, antibacterial, whitening, and/or anti-caries function.

Operations performed and materials used at S04 may be similar to that performed and used at S03. At S04, a small molecule blocking layer (e.g., the first coating layer 301 as shown in FIG. 3) is deposited over the inner and outer surfaces of the base. The small molecule blocking layer is the first coating layer and designed for blocking the small molecules. The small molecule blocking layer may also have a waterproof, antibacterial, whitening, and/or anti-caries function. Optionally, two thin layers may be made sequentially over the base to form the blocking layer, where the two thin layers provide small molecule blocking and additional functions (e.g., a waterproof, antibacterial, whitening, and/or anti-caries function), respectively.

At S05, a second coating layer (e.g., the second coating layer 302 as shown in FIG. 3) is formed over the first coating layer. The second coating layer may be formed by techniques such as CVD, PVD, dip coating, air spraying, airless spraying, or electrostatic spraying. The second coating layer may have materials and structures that provide one or more of the antibacterial, whitening, and anti-caries functions. In some cases, the second coating layer covers the first coating layer completely. Optionally, the second coating layer may cover the first coating layer partially. The second coating layer may cover the first coating layer only in the cavity of the clear aligner in some aspects (e.g., the second coating layer 402 as shown in FIG. 4).

Therefore, one or more coating layers may be formed over the inner and outer surfaces of the base. The one or more coating layers may block movements of the small molecules and keep the small molecules in the base. The one or more coating layers may also provide waterproof and other functions such as antibacterial, whitening, and anti-caries functions. The small molecule blocking function of the coating layer facilitates improving and maintaining the ductility and toughness of the base. The water-proof function of the coating layer protects the structure of the clear aligner. The antibacterial, whitening, and anti-caries functions of the coating layer protect the teeth and improve conditions of the teeth.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:
1. A dental appliance, comprising:
a base, the base having a three-dimensional (3D) shell-shaped structure configured according to a treatment plan, and including a polymeric material and ethanol, the ethanol being unbound small molecules and non-reactive diluent, the base being photopolymerized from urethane acrylate oligomers and (meth)acrylate and vinyl monomers, a ratio of a weight of the ethanol to a weight of the base after the base is formed being greater than 0.5% and smaller than 10% for increasing ductility and toughness of the base, wherein the base is further photopolymerized from a liquid photopolymer resin including 40% of difunctional aliphatic polyether urethane methacrylate, 10% of aliphatic urethane dimethacrylate, 15% of 4-acryloylmorpholine, 10% of vinyl methyl oxazolidinone, 15% of tricyclo decanedimethanol diacrylate, 8% of acrylic acid, 1.5% of 2-hydroxy-2-methyl-1-phenyl-propan-1-one, 0.3% of N-nitroso-N-phenylhydroxylamine aluminum salt, and 0.2% of 2-(2H-benzotriazol-2-yl)-4,6-bis(1-methyl-1-phenylethyl) phenol, and percentage is in weight based on a weight of total liquids; and a coating layer of a silicone material formed at least in a partial region of an inner surface and an outer surface of the base, the coating layer surrounding the base at least partially and blocking a movement of the unbound small molecules.

2. The appliance according to claim 1, further comprising: an additional coating layer formed only over the inner surface of the base, the additional coating layer being translucent or opaque, covering the coating layer partially and providing an antibacterial, whitening, and/or anti-caries function.

3. The appliance according to claim 1, wherein the coating layer provides one or more of an antibacterial function, a teeth whitening function, and an anti-caries function.

4. The appliance according to claim 3, wherein the coating layer includes one or more of following agents or compounds: a bacteriostatic agent that comprises a compound capable of releasing radicals and groups that disrupt bacterial cell membranes, inhibit bacterial growth, or reduce bacterial colonization on a material surface; a teeth whitening agent comprising a compound that interacts with tooth stains or discolorations, aids in tooth stain removal, or lightens teeth; a fluoride compound enhancing tooth enamel strength; an antimicrobial agent disrupting bacterial integrity; and a remineralizing agent promoting enamel mineral replenishment.

5. The appliance according to claim 1, wherein molecular weight cut off (MWCO) of the coating layer is smaller than 2000 Daltons to block the movement of the unbound small molecules or the coating layer includes a particle, filler, additive, modifier, or agent that enhances a hydrophobic characteristic of the coating layer.

6. The appliance according to claim 1, further comprising: an additional coating layer, the coating layer being between the base and the additional coating layer, and the additional coating layer providing a waterproof, antibacterial, whitening, and/or anti-caries function.

7. A dental appliance, comprising:
a base, the base having a three-dimensional (3D) shell-shaped structure configured according to a treatment plan, and including a polymeric material and water, the water being unbound small molecules and nonreactive diluent, the base being photopolymerized from urethane acrylate oligomers and (meth)acrylate, a ratio of a weight of the water to a weight of the base after the base is formed being around 1.6% for increasing ductility and toughness of the base, wherein the base is further photopolymerized from a liquid photopolymer resin including 30% of urethane diacrylate, 32% of hydroxyethyl methacrylate, 20% of polyethylene diacrylate, 15% of trimethylolpropane triacrylate, 2.5% of 2,4,6-trimethylbenzoyldi-phenylphosphinate, 0.2% of 2-(2'-Hydroxy-3',5'-di-tert-butylphenyl)-5-chlorobenzotriazole, and 0.3% of butylated hydroxytoluene (BHT), and percentage is in weight based on a weight of total liquids; and a coating layer of a parylene C material formed at least in a partial region of an inner surface and an outer surface of the base, the coating layer surrounding the base at least partially and blocking a movement of the unbound small molecules.

8. The appliance according to claim 7, further comprising: an additional coating layer formed only over the inner surface of the base, the additional coating layer being translucent or opaque, covering the coating layer partially and providing an antibacterial, whitening, and/or anti-caries function.

9. The appliance according to claim 7, wherein the coating layer provides one or more of an antibacterial function, a teeth whitening function, and an anti-caries function.

10. The appliance according to claim 7, wherein molecular weight cut off (MWCO) of the coating layer is smaller than 2000 Daltons to block the movement of the unbound small molecules.

* * * * *